UNITED STATES PATENT OFFICE.

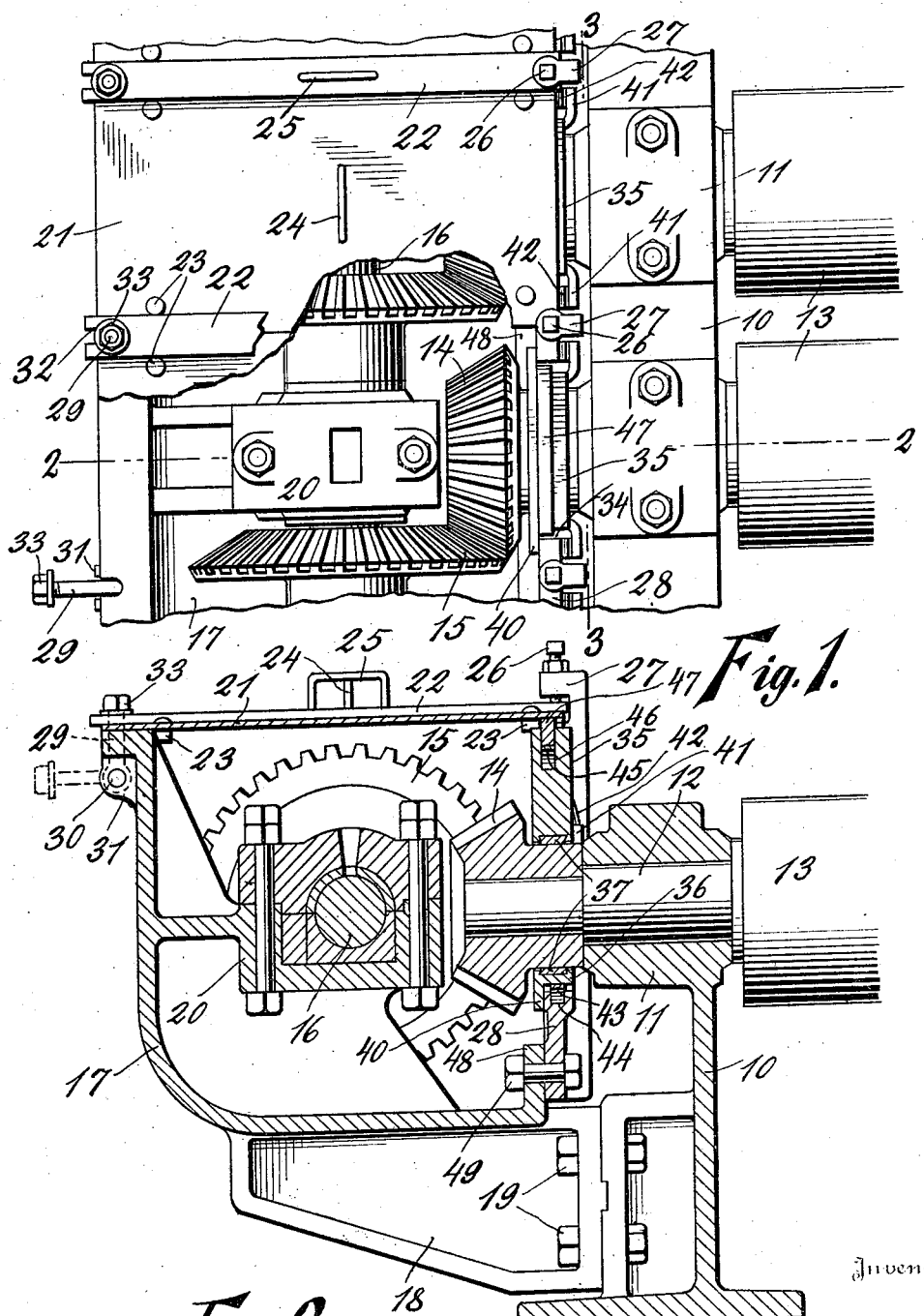

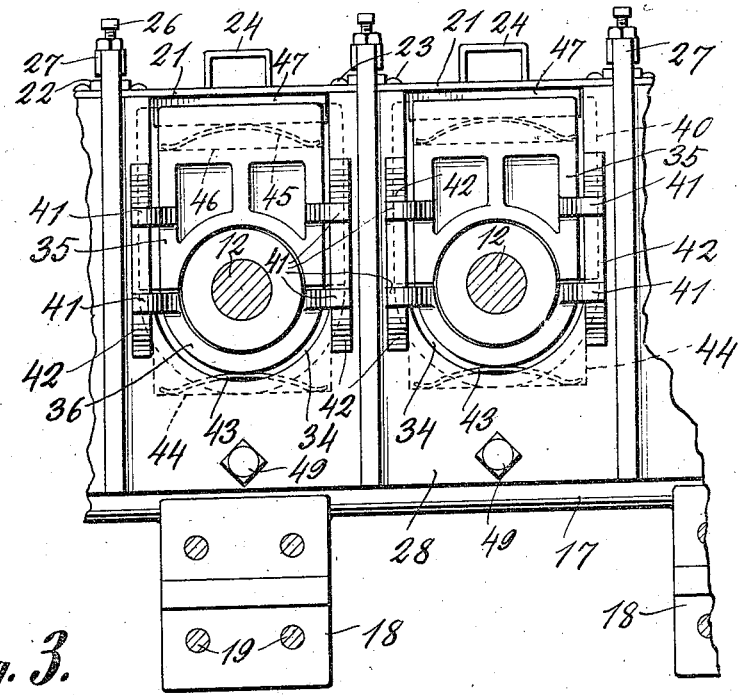
Fig. 3.
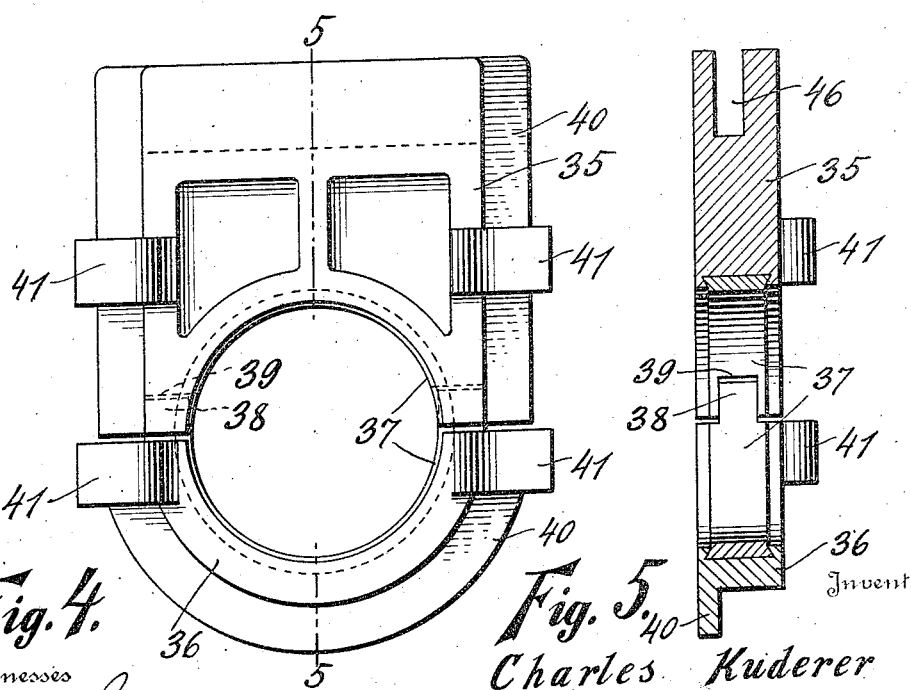
Fig. 4.
Fig. 5.
Witnesses
Inventor
Charles Kuderer

CHARLES KUDERER, OF PITTSBURGH, PENNSYLVANIA.

GUARD FOR LUBRICATING DEVICES.

1,157,311.   Specification of Letters Patent.   Patented Oct. 19, 1915.

Application filed October 19, 1914. Serial No. 867,386.

*To all whom it may concern:*

Be it known that I, CHARLES KUDERER, a citizen of the United States, residing at Pittsburgh, in the county of Allegheny and State of Pennsylvania, have invented certain new and useful Improvements in Guards for Lubricating Devices, of which the following is a specification.

This invention relates to lubricating devices designed more particularly for the drive shaft and the gears of rolling mill tables, and its object is to provide a novel and improved structure of this kind which insures the proper lubrication of the gears and the shaft bearings.

The invention comprises a trough in which the drive shaft and the gears are inclosed, said trough having a gland or closure of improved construction which renders the trough dustproof and oil tight.

The invention also has for its object to provide a structure which permits the ready removal of the entire trough and the drive shaft without disturbing the table rollers.

Other objects and advantages of the invention will be pointed out in the detailed description appearing hereinafter, and in order that the same may be better understood, reference is had to the accompanying drawings, in which—

Figure 1 is a plan view with parts broken away, showing the application of the invention; Fig. 2 is a cross section on the line 2—2 of Fig. 1; Fig. 3 is a section on the line 3—3 of Fig. 1: Fig. 4 is a face view of one of the glands, and Fig. 5 is a vertical section on the line 5—5 of Fig. 4.

Referring specifically to the drawings 10 denotes a stand having bearings 11 for the journals 12 on one end of the table rollers 13. On the ends of the journals are bevel gears 14 which are in mesh with bevel gears 15 on a drive shaft 16, whereby the rollers are driven from said shaft. The drive shaft and the bevel gears are inclosed in a trough 17 which is of such length as to inclose the drive gears of all the table rollers. As it is not necessary to an understanding of the invention to illustrate all the rollers, only two of such are shown in the drawing. The bottom of the trough has webs 18 which are bolted to the stand 10 as indicated at 19. In the trough are journal bearings 20 for the drive shaft 16. The top of the trough is provided with a lid or cover 21 which is removable in order that access to the parts inclosed in the trough may be had. The lid is in sections, each section being a flat plate, which seats on top of the trough. The plates are held in place by cross bars 22 fitting on top thereof over the joint therebetween. On the bottom of the plates are centering pins 23, and each plate has a handle 24 to facilitate removal, a handle 25 being also provided for the cross bars. The cross bars are clamped down at one end by screws 26 carried by an overhanging support and lug 27 extending from the rear wall 28 of the trough. The other ends of the cross bars are clamped down by bolts 29, pivoted at 30 to lugs 31 on the front wall of the trough. The front ends of the cross bars have slots 32 to receive the bolts and upon screwing down the nuts 33 carried by the bolts the front ends of the bars are clamped down on the trough. The pivotal support of the bolts, and the slots in the cross bars enable the bolts to be swung down to clear the cross bars, thus releasing the front ends thereof, and upon backing the screws 26, the plates may be removed. Any one of the plates may thus be readily removed, and it is not necessary to remove all the plates if only a certain portion of the trough is to be opened.

In the rear wall 28 of the trough are openings 34 so that the gears 14 may enter the trough. Over each of these openings is mounted a gland which provides a dustproof and oil tight closure. This gland comprises top and bottom sections 35 and 36 respectively having opposite semi-circular openings to accommodate the hub of the gear. The openings have a Babbitt lining 37. The meeting ends of the sections, on both sides of the openings are connected by a tenon-and-mortise joint, the tenons 38 being on the section 36 and the section 35 having the mortises 39 to receive the tenons. This joint is continued through the Babbitt lining. By providing a Babbitt lining there is no wear on the gland, and the lining can be readily renewed when worn.

The following means are provided for securing the gland in place on the trough: The gland seats in the opening 34 and the sides and bottom of the gland have a reduced marginal portion 40 forming a flange, which latter, when the gland is in place seats against the inner face of the wall 28, thus preventing outward displacement of the gland. On the outer face of the gland, on both sides of the opening, are outstanding lugs 41 which are spaced from said face so as to come opposite the outer face of the wall 28 when the gland is in place. Between these lugs and the wall 28 are located bowed springs 42 which tend to force the gland outward, whereby the flange 40 is held tightly pressed against the inner face of the wall 28. A bowed spring 43 presses against the bottom of the gland, said spring seating in a recess 44 in the bottom edge of the opening 34. Another bowed spring 45 seats in a recess 46 in the top edge of the gland. The back of this spring bears against a joint bar 47 extending across the upper portion of the opening 34, and presses said bar against the under side of the lid 21, said bar extending partly into the recess 46.

The arrangement of the gland and associate parts hereinbefore described provides a dust-proof and oil-tight closure for the trough 17. In use the trough will be partly filled with oil so that the gears 14 and 15 dip thereinto, and as the gears revolve the oil is carried upward and splashed over the shaft bearings 20.

The wall 28 is removably connected to the trough 17, the latter having an upstanding rear flange 48 at the bottom, to which said wall is bolted as indicated at 49. By making the wall 28 detachable from the trough it is possible to remove the entire trough and the drive shaft without removing or disturbing the table rollers.

I claim:—

1. The combination of a lubricant trough having an opening in one of its walls to accommodate a rotatable element, the edge of the opening at the bottom thereof having a recess, a gland seating in the opening and having a top recess, a spring located in the first mentioned recess and bearing against the bottom of the gland, a joint bar extending across the top portion of the trough opening and extending into the top recess of the gland, and a spring in said top recess between the inner end thereof and the joint bar.

2. The combination of a lubricant trough having an opening in one of its walls to accommodate a rotatable element, a gland seating in said opening and having a marginal flange on one side seating against one face of the aforesaid trough wall, outstanding lugs on the gland, and springs between the lugs and the other face of the trough wall.

3. The combination of a lubricant trough having an opening in one of its walls to accommodate a rotatable element, a gland seating in said opening and having a marginal flange on one side seating against one face of the aforesaid trough wall, outstanding lugs on the gland, springs between the lugs and the other face of the trough wall, the edge of the trough opening at the bottom thereof having a recess, and the gland having a top recess, a spring located in the first mentioned recess and bearing against the bottom of the gland, a joint bar extending across the top portion of the trough opening and extending into the top recess of the gland, and a spring in said top recess between the inner end thereof and the joint bar.

In testimony whereof I affix my signature in presence of two witnesses.

CHARLES KUDERER.

Witnesses:
ELMER T. WALDSCHMIDT,
FRED. WALDSCHMIDT.